United States Patent [19]

Yanosy, Jr. et al.

[11] Patent Number: 4,719,617
[45] Date of Patent: Jan. 12, 1988

[54] FULL SERVICE VOICE/DATA SYSTEM

[75] Inventors: John A. Yanosy, Jr., Stratford; Jitender K. Vij, Trumbull; John P. Hufnagel, Southbury; Paul Oldyzko, Stratford; Anthony J. Dennett, Shelton, all of Conn.

[73] Assignee: U.S. Holding Company, New York, N.Y.

[21] Appl. No.: 705,460

[22] Filed: Feb. 25, 1985

[51] Int. Cl.⁴ ............................................. H04Q 11/04
[52] U.S. Cl. .................................. 370/58; 370/110.1; 370/85
[58] Field of Search ................... 370/58, 110.1, 89, 85, 370/88

[56] References Cited

U.S. PATENT DOCUMENTS

| | | | |
|---|---|---|---|
| 4,251,880 | 2/1981 | Baugh et al. | 370/89 |
| 4,413,337 | 11/1983 | Dauphin et al. | 370/110.1 |
| 4,476,559 | 10/1984 | Brolin et al. | 370/110.1 |
| 4,488,294 | 12/1984 | Christensen et al. | 370/110.1 |
| 4,512,017 | 4/1985 | Nici et al. | 370/110.1 |
| 4,536,874 | 8/1985 | Stoffel et al. | 370/85 |

Primary Examiner—Douglas W. Olms
Assistant Examiner—Wellington Chin
Attorney, Agent, or Firm—Peter C. Van Der Sluys

[57] ABSTRACT

A full service voice/data system includes a networking medium having a plurality of substantially identical subsystems interconnected thereto. Each subsystem includes a local voice information path and a local data information path, the local data information path including a masterless multiple access contention bus with collision detection.

26 Claims, 4 Drawing Figures

FULL SERVICE VOICE/DATA SYSTEM

CROSS-REFERENCE TO RELATED APPLICATIONS:

This application is related to one, or more, of the following U.S. patent applications: Ser. Nos. 670,682; 670,701 both filed on Nov. 13, 1984. Ser. Nos. 705,456; 705,457; 705,458; 705,459; 705,461; 705,462; 705,463; 705,465; 705,464 all filed on even date herewith. All of the above applications are assigned to the assignee hereof.

BACKGROUND OF THE INVENTION

The present invention generally relates to a full service voice/data system and, in particular, relates to such a voice/data system having a plurality of subsystems, each having a fully distributed multi-microcomputer architecture, interconnected by a networking medium.

The recent development of data oriented devices has impacted substantially every business regardless of its size. In order to maximize the benefits derived from such devices, it becomes necessary to integrate the data devices with existing, and future, voice oriented equipment. By integrating both voice and data devices, a full service voice/data system can be provided to allow interconnectivity between and among all such devices. As a consequence, the voice and data services desired by a subscriber are available without requiring specialized equipment for each or any of the devices used.

Perhaps the primary problem faced by purchasers of present integrated voice/data systems is the initial decisions necessary regarding the operating factors of the system such as: the number of users to be connected; the services to be provided; and the traffic capacity to be sustained. These factors are important since present voice/data systems are specified to meet these needs and any subsequent changes in one or more of these factors can require the redesign of the voice/data system. Such a redesign is both expensive and time consuming.

One reason the redesign of present voice/data systems is expensive is that most of the systems are provided with a centralized control processing unit. Thus, when the capacity of this centralized processor is exceeded all subscribers to the system receive reduced services. A further drawback of such a centralized system is that the failure of the centralized portion catastrophically impacts all users thereof. Further, the central processing unit is obviously a source of bottlenecking during heavy traffic conditions.

One conventional solution to the problems of a strictly centralized system has been to provide a plurality of subsystems interconnected by a central switch. To date, however, each such subsystem had, in and of itself, a centralized processing unit. As such, each subsystem now becomes the focus of catastrophic failure as well as being a source of bottlenecking. Further, when the capacity of the system is exceeded the architecture and distribution of these subsystems must also be included in a system redesign.

As a consequence, businesses presently seeking full service voice/data systems must either purchase a system exceeding their present needs or face an expensive system redesign at some time in the future.

SUMMARY OF THE INVENTION

Accordingly, it is one object of the present invention to provide a full service voice/data system that is decentralized in nature and configured for modular expansion as expanded service and/or capacity is desired.

The object is accomplished, at least in part, by a full service voice/data system having a plurality of subsystems each having a fully distributed multi-microcomputer architecture and interconnected by a networking medium.

Other objects and advantages will become apparent to those skilled in the art from the following detailed description read in conjunction with the appended claims and the drawings attached hereto.

DETAILED DESCRIPTION OF THE INVENTION

Figure 1:
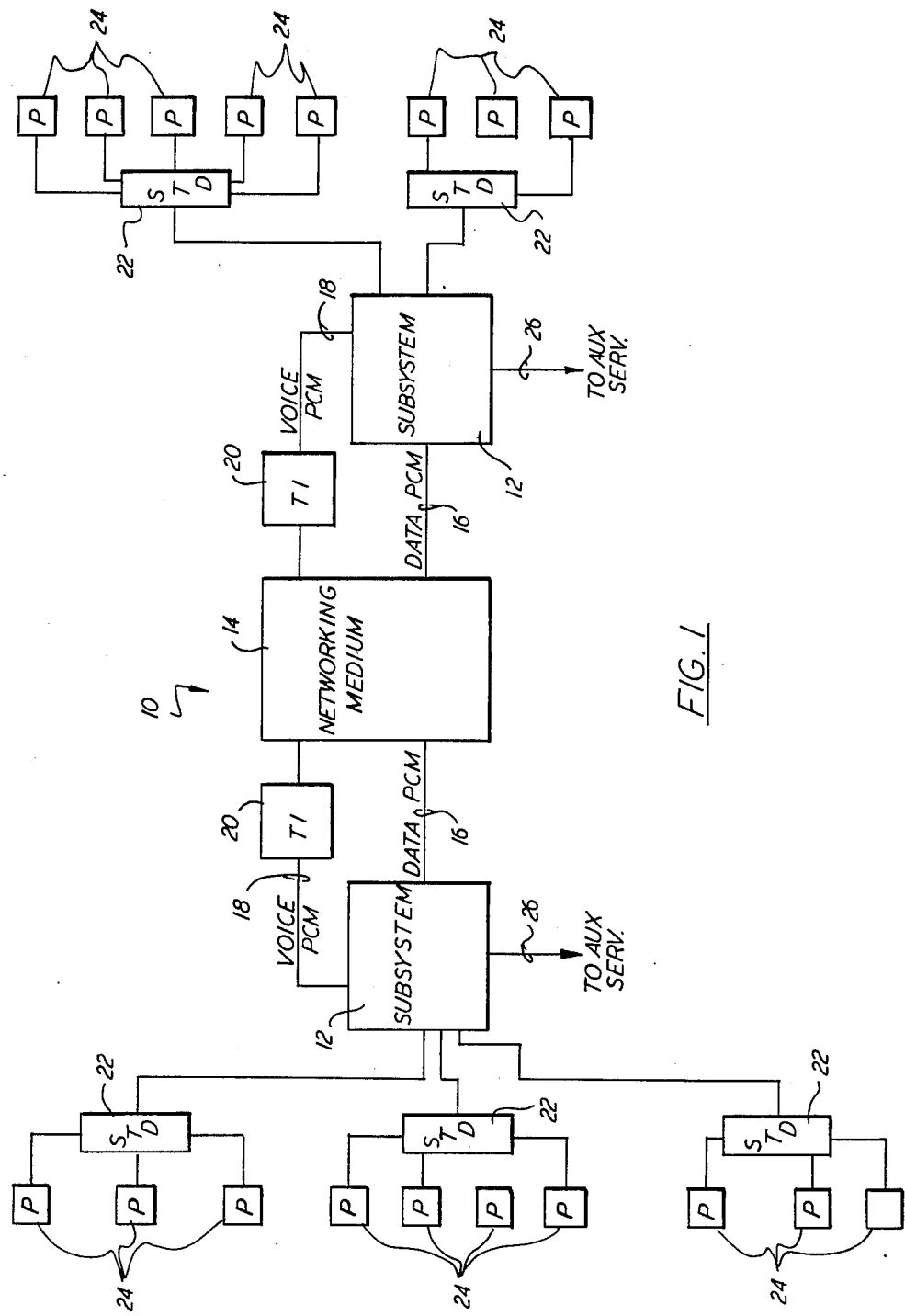
FIG. 1 is a block diagram of a full service voice/data system embodying the principles of the present invention.

A full service voice/data system, generally indicated at 10 in FIG. 1 and embodying the principles of the present invention, includes a plurality of subsystems 12 interconnected by a networking medium 14. Each subsystem 12 is interconnected to the networking medium 14 by a first, or data, communication link 16 and by a second, or voice, communication link 18, the second communication link 18 including a terminal interface 20 in the path thereof. In addition, each subsystem 12 interfaces with a plurality of subscriber termination devices 22, each subscriber termination device 22 interconnecting with a plurality of peripherals 24. As used herein, the term "peripheral", or the idiomatic equivalent thereof, includes all voice and data oriented devices. In the preferred embodiment, each subsystem 12 includes means 26 for providing access to auxiliary services.

In one preferred embodiment, the networking medium 14 is a digital switch such as, for example the ITT SYSTEM 12 digital exchange. The ITT SYSTEM 12 digital exchange, need ITT 1240 Digital Exchange, is fully described and discussed in "ELECTRICAL COMMUNICATION", Vol. 56, No. ⅔, 1981. As discussed therein a plurality of digital switches, as system growth requirements demand, can be interconnected to form a communication system. Nevertheless, each digital switch remains a discrete entity within a communication system thus formed. In this embodiment, the digital switch has a distributed control architecture wherein the control of the communication system is fully distributed to each digital switch interfacing therewith. Thus, each digital switch addresses only the mechanisms necessary for establishing a communication path through the system to interconnect different ones of the subsystems 12.

In addition, each digital switch includes means for autonomously setting up such a path, at the request of a subsystem 12, according to a uniform internal control scheme integral therewith. Thus, the digital switch does not change or otherwise manipulate any of the data packets launched thereinto. In fact, the subsystems 12 each individually attach appropriate digital switch commands to each data packet. The attached commands control the routing of the packets through the digital switch. In such an embodiment the communication system or, if only a single digital switch is used, the digital switch provides the required physical connectivity between subsystems 12 as well as maintenance and alarm signals that are reflected, as necessary, back to each subsystem 12, thereby relieving the individual subsystems 12 of these functions and services. Nevertheless, each subsystem 12 preferably includes all necessary internal traffic distribution control, flow control, congestion detection and control mechanisms required to ensure that each subsystem 12 is fully autonomous. One apparatus and method for implementing these mechanisms is described and discussed in U.S. patent application Ser. No. 705,465 entitled "Data Subsystem Traffic Control Apparatus and Method" filed on even date herewith and assigned to the assignee hereof. This application is deemed incorporated herein by reference.

In the preferred embodiment, the data links 16, with respect to each subsystem 12, include access to, for example, thirty pairs of simplex, i.e., unidirectional paths on a PCM link. Consequently, thirty independent transmit channels and eight independent receive channels can transmit and receive packets simultaneously. As more fully discussed below, in reference to the embodiment shown in FIG. 2, the thirty pairs of simplex paths allow eight separate network interface devices, wherein each network interface device can access any eight of such thirty simplex channels to be interfaced to each PCM link, wherein there are two such links connected within each autonomous subsystem 12. The two links within each subsystem 12 thus constitute the data link 16. Further, the inclusion of, for example, a variable number, i.e. from 1 to 4, such network interface devices generally provides more than enough capacity for any subsystem 12.

Figure 2:
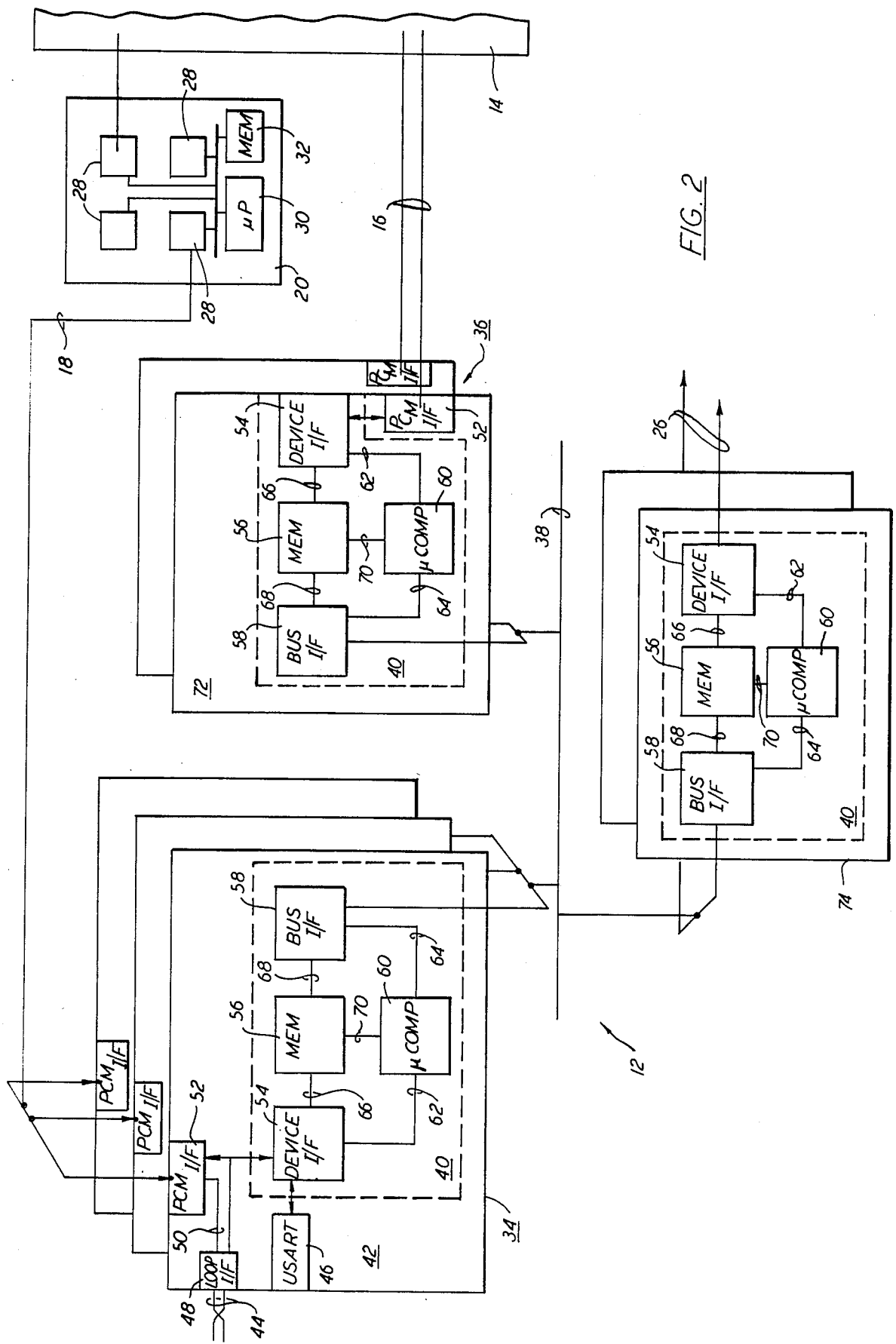
FIG. 2 is a block diagram of a subsystem and a network terminal interface useful as shown in FIG. 1.

In this embodiment, as shown in FIG. 1, and as discussed in the above-referenced "ELECTRICAL COMMUNICATION" articles, the digital switch of the networking medium 14 has a terminal interface 20 associated therewith. Typically, as shown in FIG. 2, each terminal interface 20 includes a plurality of terminations 28, a microprocessor 30 and a memory 32. The microprocessor 30, via programs and information stored in the memory 32, is adapted to control the establishment of voice paths through the networking medium 14. As used herein a voice path, or the idiomatic equivalent thereof, is characterized as including a time-division-multiplexed bus portion whereas a data path includes a contention bus portion. The inclusion of the terminal terminal interface 20 in the voice path is preferred since voice traffic, usually non-packetized digital information, requires external path set-up and teardown command and control facilities. As shown in FIG. 2, the data communication link 16 is direct from the associated subsystem 12 and the networking medium 14. Such an arrangement is advantageous since, by packetized communication, the routing or destination, information is, preferably, included in one of the fields of the data packets. Further, since data paths are only established on a demand basis, i.e. by use of virtual links, the paths can be torn down via information included in the fields of the last data packets.

A subsystem, generally indicated at 12 in FIGS. 1 and 2, preferably includes means 34 for interfacing with the plurality of peripherals 24, means 36 for interfacing with the networking medium 14 and means 38 for establishing data communication between and among the peripheral interface means 34 and the networking medium interfacing means 36. In addition, each subsystem 12 preferably includes the means 26 for providing access to auxiliary services, the means 26 being interconnected with the data communication establishing means 38. Hence, means 26 is adapted to communicate data with the peripheral interface means 34 and/or the networking medium interfacing means 36. As more fully explained below, the peripheral interfacing means 34 and the networking medium interfacing means 36 include substantially identical data transport controllers 40. Further, the auxiliary services access providing means 26 includes such data transport controllers. Hence, all traffic is regulated by a fully distributed multi-microcomputer architecture.

In one preferred embodiment, the means 34 for interfacing with a plurality of peripherals 24 includes a plurality of substantially identical peripheral interface devices, generally indicated at 42 in FIG. 2, each of which is adapted to interface with voice and/or data peripherals via, for example, a plurality of twisted pairs of wires 44 or other communication link mechanism such as a fiber optic link or the like. As depicted, each peripheral interface device 42 includes the data transport controller 40 effectively interconnected between a plurality of universal synchronous/asynchronous receive/transmit (USART) devices 46 and the means 38, hereinafter referred to as the intrasubsystem bus. In this embodiment, each peripheral interface device 42 includes a subscriber loop interface 48 associated with each pair of twisted wires 44. Each subscriber loop interface 48, inter alia, exchanges data information with one of the USARTs 46 and exchanges voice information with a local voice bus 50 which voice bus 50 is interconnected with a pulse-coded-modulation (PCM) bus interface device 52.

In the preferred embodiment, the data transport controller 40 includes a device interface controller 54, a storage medium 56, a bus interface controller 58 and a microcomputer 60. In addition, in the preferred implementation, the device interface controller 54 and the bus interface controller 58 each have direct communication with the microcomputer 60 only via a set of interrupt/channel attention lines, 62 and 64, respectively. Further, the device interface controller 54 and the bus interface controller 58, effectively, independently interconnect with the storage medium 56 via separate address/data buses, 66 and 68, respectively. The microcomputer 60 interconnects with the storage medium via bus 70 that supports control, address and data exchanges therebetween.

One data transport controller 40 particularly adapted for use in the subsystem 12 is described and discussed in U.S. patent application Ser. No. 705,457 entitled "Data Transport Control Apparatus" filed on even date herewith and assigned to the assignee hereof. Further, the device interface controller 54 is preferably of the type described and discussed in U.S. patent application Ser. No. 705,458 entitled "Device Interface Controller" filed on even date herewith and assigned to the assignee hereof. In addition, examples of an intrasubsystem bus 38 are described and discussed in U.S. patent application Ser. Nos. 670,682 and 670,701 both filed on Nov. 13, 1984 and assigned to the assignee hereof. The above identified applications are deemed incorporated herein by reference.

The intrasubsystem bus 38 is, preferably, a masterless multiple-access contention bus with collision detection. In fact, as described and discussed in the referenced U.S. patent applications Ser. Nos. 670,682 and 670,701, the intrasubsystem bus 38 includes a data transport medium, a collision detection medium and a clock signal medium; the data transport medium being separate and distinct from the collision detection medium.

Figure 3:
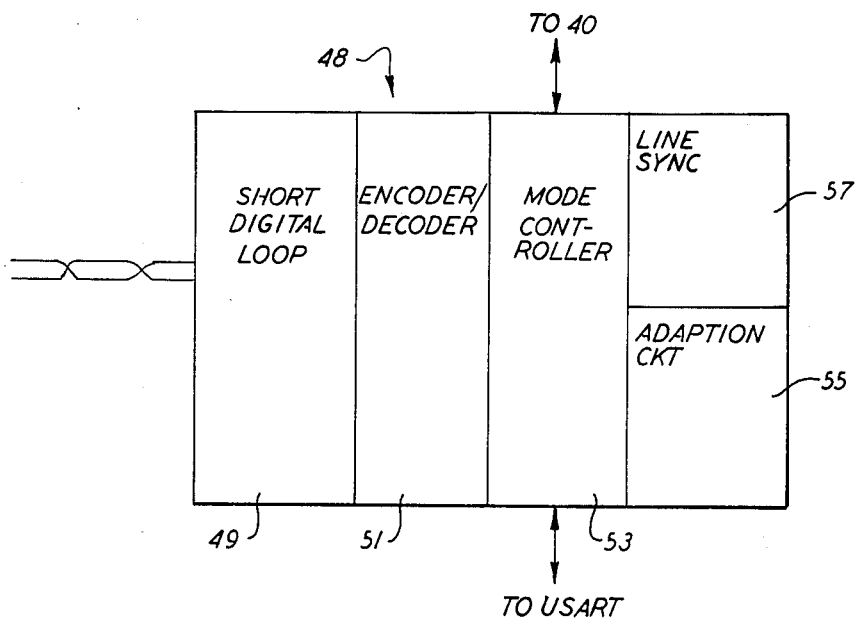
FIG. 3 is a block diagram of a subscriber loop interface adapted for use as shown in FIG. 2.

In the preferred embodiment, each peripheral interface device 42 is adapted for both voice and data communication. In such an implementation, the loop interface devices 48, inter alia, multiplexes/demultiplexes the voice and data information thereby establishing a voice path with voice bus 18 via the PCM bus interface 52. A block diagram of a loop interface 48 is shown in FIG. 3 and includes a short digital loop 49, an encoder/decoder 51, a mode controller 53, a line adaptation circuit 55 and a line synchronization device 57 for synchronizing the line adaptation procedure. In one specific embodiment, the short digital loop 49 is of the type described and discussed in U.S. patent application Ser. No. 596,328 filed on Apr. 3, 1984 and assigned to the assignee hereof. The line synchronization device 57 is preferably of the type described and discussed in U.S. patent application Ser. No. 705,459 entitled "Apparatus and Method for Use in Synchronizing Devices" filed on even date herewith and assigned to the assignee hereof. The encoder/decoder 51 and the mode controller 53 are implemented using conventional technology as discussed in U.S. patent application Ser. No. 705,462 entitled "System for Providing Data Services to a Circuit Switched Exchange" filed on even date herewith and assigned to the assignee hereof. As discussed in the referenced U.S. patent application Ser. No. 705,459 entitled "Apparatus and Method for Use in Synchronizing Devices" the adaptation circuitry 55 can be selected for such circuits known in the art. The patent applications identified immediately above are deemed incorporated herein by reference.

One particular PCM bus interface 52 is described and discussed in U.S. patent application Ser. No. 682,228 filed on Dec. 14, 1984 entitled "Apparatus for Establishing Communication Paths" and assigned to the assignee hereof. To the extent that the functions of the present PCM bus interface device are discussed and described in the device of U.S. patent application Ser. No. 682,228 that application is deemed incorporated herein by reference. As discussed therein the apparatus has a plurality of serial ports, each terminating therewithin to a time-division-multiplexed bus, and includes a switch, controlled by a switch controller, adapted to dynamically assigned switch paths. One particular switch for providing dynamically assigned switch paths is described and discussed in U.S. patent application Ser. No. 682,033 filed on Dec. 14, 1984 and assigned to the assignee hereof. A switch controller for use in conjunction with the above referenced switch for providing dynamically assigned switch paths is described and discussed in U.S. patent application Ser. No. 682,030 filed on Dec. 14, 1984 and assigned to the assignee hereof. These patent applications are also deemed incorporated herein by reference.

As discussed in the last three referenced patent applications the PCM bus interface device 52 is adapted to receive voice information and establish paths for that voice information to the PCM bus 18 which bus 18, for example, can provide up to 30 full duplex channels.

In the preferred embodiment, the means 36 for interfacing with a networking medium 14 includes at least one network interface device 72. As shown, the network interface device 72 includes a data transport controller 40 interconnected between the intrasubsystem bus 38 and a PCM bus interface 52. The PCM bus interface 52 interfacing with the data PCM bus 16 that interconnects with the networking medium 14.

The data transport controller 40 is, in the hardware implementation thereof, substantially completely identical to the data transport controller 40 employed on each peripheral interface device 42. That is, the same data transport controller 40, as a module, is universally used in every peripheral interface device 42 and every network interface device 72 in the voice/data system 10. As more fully discussed below, the only difference between the data transport controllers 40 used on the peripheral interface devices 42 and the network interface devices 72 is the tasks assigned thereto by software programs downloaded thereinto.

Preferably, the means 26 for providing auxiliary services such as, any known value added services including extended communication protocol conversions, includes a gateway interface device 74 having a substantially identical data transport controller 40. The specific design of such gateway interface devices 74, essentially depends upon the auxiliary services to be provided and are programmed to execute the necessary communication protocol conversion between the protocol of the bus 38 and that of the service provider.

In one preferred embodiment, each subsystem 12 is implemented by use of known printed circuit board assembly techniques. In such an implementation a master printed circuit board assembly having the intrasubsystem bus 38 formed by, for example, etching, thereon would be provided with a plurality of printed circuit board connectors. For simplicity, although not necessary, each peripheral interface device 42 would be implemented on separate dedicated printed circuit board assemblies. Hence, each subsystem 12 would thus be modularly expandable with a minimal initial investment.

Operationally, in each subsystem 12, each peripheral interface device 42 interconnects with a plurality of peripherals 24, via the subscriber termination devices 22 associated therewith all of those peripherals 24 operating according to the same communication protocol. Further, due, in part to the universal system-wide inclusion of a common data transport controller 40 on each and every device 42, 72 and 74, each subsystem 12, and, hence the entire full service voice/data system 10 has a uniform protocol. Hence, by assigning each peripheral interface device 42 to peripherals 24 of a common communication protocol the number of communication protocol conversions, and the resultant traffic loading is reduced. One such technique of executing communication protocol conversions and the benefits derived therefrom is described and discussed in U.S. patent application Ser. No. 705,461 entitled "Apparatus and Method for Executing Communication Protocol Conversions" filed on even date herewith and assigned to the assignee hereof. This application is deemed incorporated herein by reference.

One communication subsystem 12 particularly adapted for use in the full service voice/data system 10 is described and discussed in U.S. patent application Ser. No. 705,464 filed on even date herewith and assigned to the assignee hereof. This application is deemed incorporated herein by reference.

Figure 4:
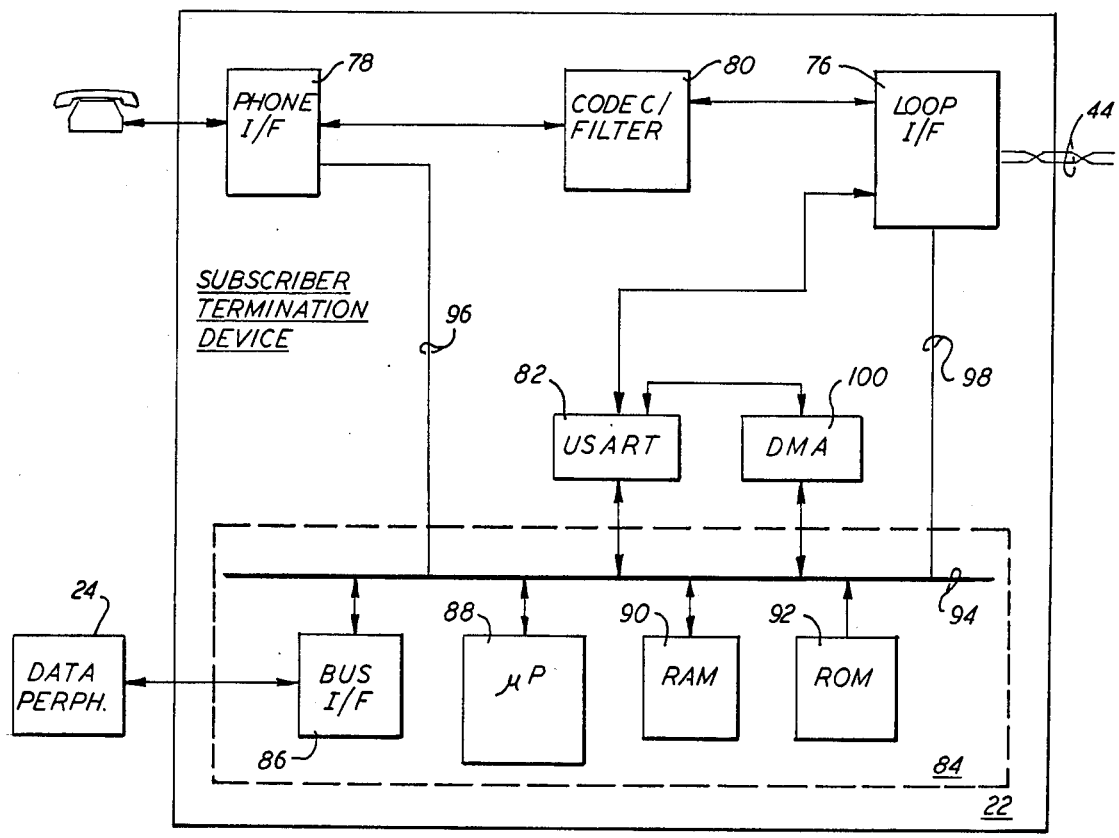
FIG. 4 is a block diagram of a subscriber termination device useful in the system shown in FIG. 1.

One particular subscriber termination device 22, adapted for use in the system 10 is shown in the block diagram of FIG. 4. As shown therein, the subscriber termination device 22 includes a subscriber loop interface device 76, substantially identical to the subscriber loop interface device 48 described above, including an SDL portion 49, an encoding/decoding portion 51, a mode control portion 53, a line adaption circuit 55 and a line synchronization device 57. In operation, the voice information is initially processed via a conventional telephonic interface 78 and digitized, via a CODEC filter 80.

One typical telephone interface 78 is the 3419 manufactured and marketed by Motorola Inc. of Schrumberg, Ill. The data information is exchanged via a USART device 82 that interfaces with a microcomputer 84. The microcomputer 84 is provided with a means 86 for interfacing with a data peripheral. Such interfacing means 86 are well known in the art and need not be described in further detail herein. Preferably, the microcomputer 84 includes a microprocessor 88 having a random-access-memory (RAM) 90 and a read-only-memory (ROM) 92 associated therewith and interconnected via the local microcomputer bus 94. Thus, the microcomputer 84 provides the data handling for the subscriber termination device 22 such as, inter alia, the packet assembly/disassembly (PAD) function, between the USART 82 and the data peripheral 24. In addition, the status of the telephone interface 78 and the mode control portion 53 are monitored by the microcomputer 84 via lines 96 and 98, respectively. In the preferred embodiment, the subscriber termination device 22 further includes a direct memory access device 100, such as a 82324 manufactured and marketed by Intel Corp. of Santa Clara, Calif., adapted to provide the USART 82 with rapid access to information stored therein while nevertheless reducing the interrupt frequency of the microcomputer 84.

Further, the subsystem 12, as described above, is, essentially, a fully distributed multi-microcomputer architecture. That is, each data transport controller 40 is, inter alia, a microcomputer and, preferably, adapted to autonomously control all traffic thereacross. One particular implementation of providing distributed autonomous control throughout a communication system is described and discussed in U.S. patent application Ser. No. 705,465 entitled "Data Subsystem Traffic Control Apparatus and Method" filed on even date herewith and assigned to the assignee hereof. This application is deemed incorporated herein by reference. As a consequence of the fully distributed nature thereof, the subsystem 10 has the paramount advantage of avoiding catastrophic failure due to any one element failure and, in fact, is capable of providing continuous, albeit reduced, voice/data services in the event of multiple element failures.

Although the present invention has been described with regard to an exemplary embodiment, other arrangements and configurations may be developed that are, nevertheless, within the scope and spirit of the present invention. Hence, the present invention is deemed limited only by the appended claims and the reasonable interpretation thereof.

What is claimed is:

1. A voice/data communication system comprising:
   a plurality of substantially identical subsystems, each said subsystem including a voice information path and a data information path, said data information path including a masterless multiple access contention bus with collision detection;
   means, within each said subsystem, for autonomously controlling all traffic therethrough wherein said autonomous traffic control means includes a multi-microcomputer distributed architecture;
   a networking medium;
   means for establishing a data link between each said subsystem and said networking medium whereby full data communication between and among said subsystems can be established; and
   means for establishing a voice link between each said subsystem and said networking medium whereby full voice communication between and among said subsystems can be established.

2. System as claimed in claim 1 further comprising:
   at least one additional one of said subsystems having only means for establishing a data link between said additional subsystem and said networking medium whereby full data communication can be established therewith.

3. System as claimed in claim 2 further comprising:
   at least another additional subsystem having only means for establishing a voice link between said another additional subsystem and said networking medium whereby full voice communication can be established therewith.

4. System as claimed in claim 1 further comprising:
   at least one additional one of said subsystems having only means for establishing a voice link between said additional subsystem and said networking medium whereby full voice communication can be established therewith.

5. System as claimed in claim 1 further comprising:
   means associated with one or more of said subsystems, for providing access to auxiliary services.

6. System as claimed in claim 1 further comprising:
   means for interfacing with a plurality of peripherals; and
   means, associated with each said subsystem, for interfacing with a plurality of said peripheral interface means.

7. System as claimed in claim 6 wherein said peripheral interfacing means is a subscriber termination device including:
   means for interfacing with voice oriented devices; and
   means for interfacing with data oriented devices.

8. System as claimed in claim 7 wherein said subscriber termination devices are remote from said subsystem associated therewith.

9. System as claimed in claim 7 wherein said voice oriented device interfacing means includes:
   a telephone interface;
   a codec filter, said codec filter being coupled to a subscriber loop interface and positioned in series between said telephone interface and said subscriber loop interface.

10. System as claimed in claim 7 wherein said data oriented device interface means includes:
    a microprocessor, said microprocessor having means associated therewith for communicating with said data oriented device; and a USART, said USART being serially located in the path between said microprocessor and a subscriber loop interface.

11. System as claimed in claim 7 further comprising:
means for multiplexing/demultiplexing voice and data from/to said voice device interfacing means and said data device interfacing means.

12. System as claimed in claim 1 further comprising:
means for interfacing said voice information path with said voice link establishing means; and
means for interfacing said data information path with said data link establishing means.

13. System as claimed in claim 12 wherein said voice information path interfacing means is substantially identical to said data information path interfacing means.

14. System as claimed in claim 1 further comprising:
a terminal interface, said terminal interface being serially positioned in each said voice link establishing means between each said subsystem and said networking medium.

15. System as claimed in claim 14 wherein each said terminal interface includes:
means for establishing a voice path across said networking medium before voice information is transmitted therethrough.

16. A voice/data communication system comprises:
a plurality of substantially identical subsystems, each said subsystem including one or more peripheral interface devices, one or more network interface devices, and means for establishing a masterless multiple access contention bus having collison detection between all said peripheral interface devices and all said network interface devices whereby data communication between and among all said peripheral devices and all said network interface devices is established;
means, within each said subsystem, for autonomously controlling all traffic therethrough wherein said autonomous traffic control means includes a multi-microcomputer distributed architecture;
a networking medium;
means for establishing a data link between each said subsystem and said networking medium whereby full data communication between and among said subsystems can be established; and
means for establishing a voice link between each said subsystem and said networking medium whereby full voice communication between and among said subsystems can be established.

17. System as claimed in claim 16 wherein each said peripheral interface device includes:
a local voice information path; and
a local data information path, said data information path interfacing with said masterless contention bus establishing means.

18. System as claimed in claim 16 wherein each said peripheral interface device and each said network interface device includes:
a data transport controller, each said data transport controller having a device interface controller, a bus interface controller, a storage medium and a microcomputer.

19. A voice/data communication system, comprising:
plurality of substantially identical subsystems, each said subsystem including a voice information path and a data information path, said data information path including a masterless multiple access contention bus with collision detection;
a networking medium;
means for establishing a data link between each said subsystem and said networking medium whereby full data communication between and among said subsystems can be established;
means for establishing a voice link between each said subsystem and said networking medium whereby full voice communication between and among said subsystems can be established;
means for interfacing with a plurality of peripherals, said interfacing means being a subscriber termination device and including means for interfacing with voice oriented devices and means for interfacing with data oriented devices, said voice oriented device interfacing means including a telephone interface and a codec filter, said codec filter being coupled to a subscriber loop interface and positioned in series between said telephone interface and said subscriber loop interface; and
means, associated with each said subsystem, for interfacing with a plurality of said peripheral interface means.

20. System as claimed in claim 19 wherein said data oriented device interfacing means includes:
a microprocessor, said microprocessor having means associated therewith for communicating with said data oriented device; and
a USART, said USART being serially located in the path between said microprocessor and said subscriber loop interface.

21. A voice/data communication system, comprising:
a plurality of substantially identical subsystems, each said subsystem including,
one or more peripheral interface devices,
one or more network interface devices, each of said peripheral interface devices and each of said network interface devices including a data transport controller, each said data transport controller having a device interface controller, a bus interface controller, a storage medium and a microcomputer, and
means for establishing a masterless multiple access contention bus having collision detection between all said peripheral interface devices and all said network interface devices, whereby data communication between and among peripheral devices and all said network interface devices is established;
means, within each said subsystem, for autonomously controlling all traffic there through wherein said autonomous traffic control means includes a multi-microcomputer distributed architecture;
a networking medium;
means for establishing a data link between each said subsystem and said networking medium whereby full data communication between and among said subsystems can be established; and
means for establishing a voice link between each said subsystem and said networking medium whereby full voice communication between and among said subsystem can be established.

22. System as claimed in claim 21 wherein each said data transport controller includes:
a first address/data bus between said device interface controller and said storage medium;
a second address/data bus between said bus interface controller and said storage medium;

a control/address/data bus between said storage medium and said microcomputer wherein said microcomputer is directly connected to said device interface controller and said bus interface controller only by interrupt/channel attention lines.

23. System as claimed in claim 21 further comprising: means for providing access to auxiliary services.

24. System as claimed in claim 23 wherein said access providing means includes a said data transport controller.

25. System as claimed in claim 24 wherein each said data transport controller includes:
means for autonomously controlling all traffic flow of said peripheral interface, said network interface, or said access providing means associated therewith.

26. A voice/data communication system, comprising:
a plurality of substantially identical subsystems, each said subsystem including,
one or more peripheral interface devices,
one or more network interface devices, each of said peripheral interface devices and each of said network interface devices including a data transport controller, each said data transport controller having a device interface controller, a bus interface controller, a storage medium, a microcomputer, a first address/data bus between said device interface controller and said storage medium, a second address/data bus between said bus interface controller and said storage medium, and a control/address/data bus between said storage medium and said microcomputer wherein said microcomputer is directly connected to said device interface controller and said bus interface controller only by interrupt/channel attention lines; and means for establishing a masterless multiple access contention bus having collision detection between all said peripheral interface devices and all said network interface devices, whereby data communication between and among peripheral devices and all said network interface devices is established;

means, within each said subsystem, for autonomously controlling all traffic there through wherein said autonomous traffic control means includes a multi-microcomputer distributed architecture;

a networking medium;

means for establishing a data link between each said subsystem and said networking medium whereby full data communication between and among said subsystem can be established; and means for establishing a voice link between each said subsystem and said networking medium whereby full voice communication between and among said subsystems can be established.

* * * * *